US012680819B2

(12) United States Patent
Guenther et al.

(10) Patent No.: US 12,680,819 B2
(45) Date of Patent: Jul. 14, 2026

(54) SYSTEM AND METHOD FOR VEHICLE ROUTE PLANNING

(71) Applicant: Torc Robotics, Inc., Blacksburg, VA (US)

(72) Inventors: Janine Guenther, Leinfelden (DE); Simon Schaefer, Stuttgart (DE); Carlo Elwinger, Maulbronn (DE)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/972,224

(22) Filed: Dec. 6, 2024

(65) Prior Publication Data

US 2026/0160565 A1     Jun. 11, 2026

(51) Int. Cl.
*G01C 21/34*        (2006.01)
*G01C 21/36*        (2006.01)

(52) U.S. Cl.
CPC ..... *G01C 21/3461* (2013.01); *G01C 21/3469* (2013.01); *G01C 21/3664* (2013.01); *G01C 21/3697* (2013.01)

(58) Field of Classification Search
CPC ............ G01C 21/3461; G01C 21/3469; G01C 21/3664; G01C 21/3697
See application file for complete search history.

(56) References Cited

U.S. PATENT DOCUMENTS

| | | | |
|---|---|---|---|
| 6,028,537 A | 2/2000 | Suman et al. | |
| 8,296,059 B2 | 10/2012 | Urciuoli et al. | |
| 9,944,282 B1 | 4/2018 | Fields et al. | |
| 10,019,904 B1 | 7/2018 | Chan et al. | |
| 10,043,376 B1 * | 8/2018 | Poornachandran | G08B 31/00 |
| 10,204,518 B1 | 2/2019 | Nepomuceno et al. | |
| 10,386,192 B1 | 8/2019 | Konrardy et al. | |
| 10,403,150 B1 | 9/2019 | Nepomuceno et al. | |
| 10,563,994 B2 | 2/2020 | Chokshi et al. | |
| 10,930,158 B1 | 2/2021 | Nepomuceno et al. | |
| 10,988,110 B1 | 4/2021 | Patnaik | |
| 11,014,567 B1 | 5/2021 | Fields et al. | |
| 11,257,377 B1 | 2/2022 | Nepomuceno et al. | |

(Continued)

OTHER PUBLICATIONS

Ajot, Business associations join forces to call for immediate action by law enforcement agencies. Retrieved online at: https://ajot.com/news/criminals-stealing-goods-worth-1.3-billion-annually-from-trucks-in-germany. 6 pages, Feb. 8, 2018.

(Continued)

*Primary Examiner* — Rodney A Butler
(74) *Attorney, Agent, or Firm* — McCarter & English, LLP

(57)        ABSTRACT

A system for vehicle route planning is provided. The system includes a database configured to electronically store crime data, and a route planning unit configured to generate a route for a vehicle. The system includes a processing device configured to execute instructions stored in a memory to perform operations including receiving as input at the route planning unit a starting location for the vehicle and an ending location for the vehicle. The operations include analyzing the crime data to determine instances of crime occurring between the starting location and the ending location. The system includes generating a planned route for the vehicle from the starting location to the ending location based on the analyzed crime data.

20 Claims, 9 Drawing Sheets

(56) References Cited

U.S. PATENT DOCUMENTS

| | | | |
|---|---|---|---|
| 2010/0100319 A1* | 4/2010 | Trinko ................. | G01C 21/367 |
| | | | 707/E17.014 |
| 2013/0060469 A1* | 3/2013 | Chen .................. | G01C 21/3469 |
| | | | 701/527 |
| 2017/0227971 A1* | 8/2017 | Shimotani ............. | B60W 40/06 |
| 2020/0364664 A1* | 11/2020 | Chen ..................... | G06N 20/00 |
| 2021/0031756 A1 | 2/2021 | Fields et al. | |
| 2022/0065641 A1 | 3/2022 | Iwamoto et al. | |
| 2022/0390245 A1 | 12/2022 | Konrardy et al. | |
| 2023/0400314 A1* | 12/2023 | Beaurepaire ....... | G01C 21/3811 |

OTHER PUBLICATIONS

King, 5 cargo theft techniques and how to avoid them. Retrieved online at: <https://www.marinetraffic.com/blog/5-cargo-theft-techniques-and-how-to-avoid-them/.> 15 pages, Oct. 13, 2023.
LPM, 11 Common Ways Cargo Theft Occurs. Retrieved online at: <https://losspreventionmedia.com/11-common-ways-cargo-theft-occurs-in-the-supply-chain-network/.> 3 pages, Jul. 24, 2019.
Pauline, Checklist for Truck Drivers. Matrack, mobile asset tracking. Retrieved online at: <https://matrackinc.com/combating-cargo-theft-a-checklist-for-truck-drivers/.> 5 pages, Jul. 1, 2021.
Travelers, 5 Cargo Theft Tactics and How to Help Prevent Them. Retrieved online at: <https://www.travelers.com/resources/business-topics/supply-chain-management/5-tactics-cargo-thieves-use.> 5 pages, retrieved Aug. 21, 2024.
Wickenhauser, In Mexico it's highway robber . . . and bullt-proof tractors. TruckingTruth News. Retrieved online at: <https://www.truckingtruth.com/news/Article-21/robbery-autonomous-trailers.> 7 pages, Feb. 4, 2019.

* cited by examiner

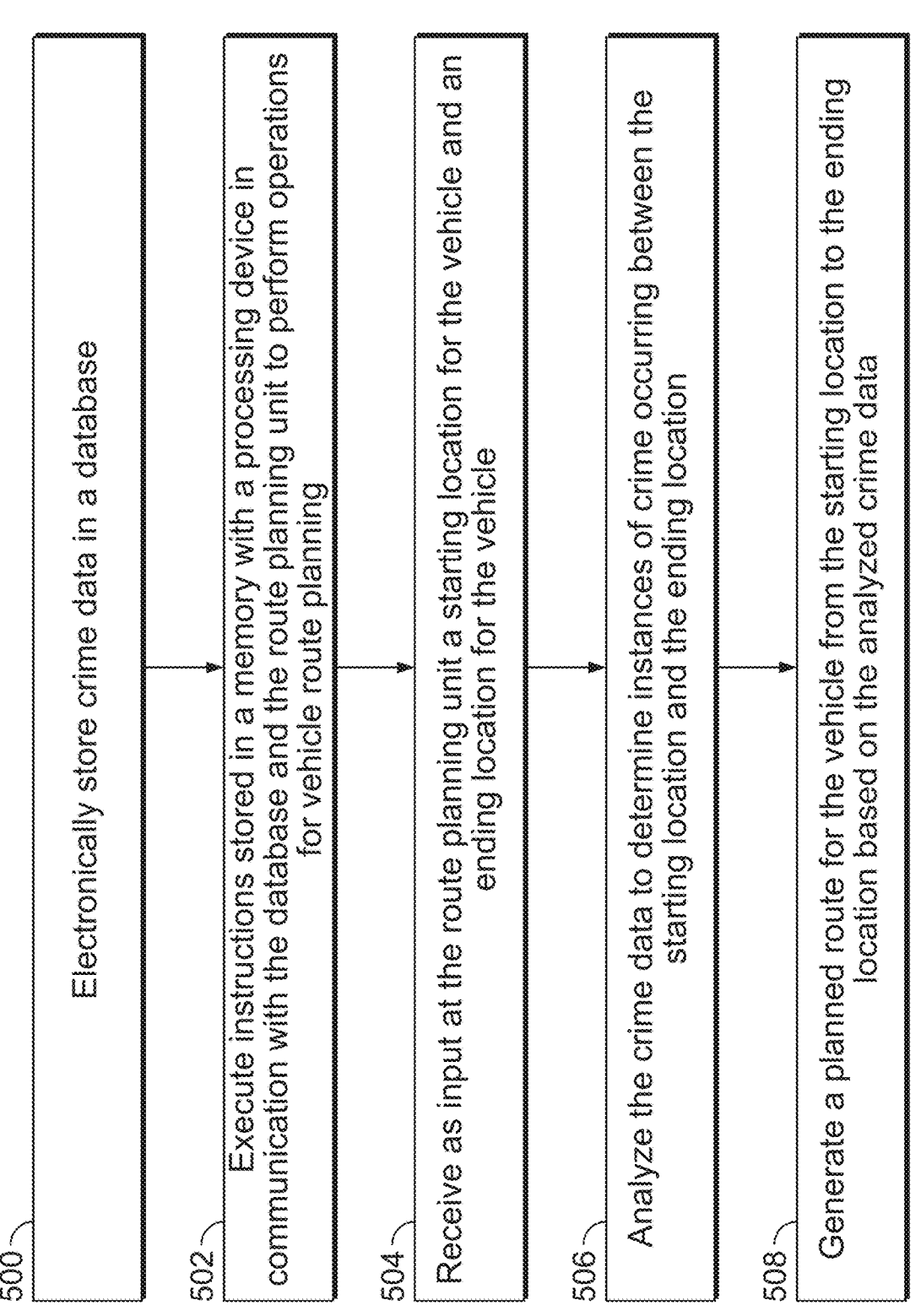

500 Electronically store crime data in a database

502 Execute instructions stored in a memory with a processing device in communication with the database and the route planning unit to perform operations for vehicle route planning 504 Receive as input at the route planning unit a starting location for the vehicle and an ending location for the vehicle 506 Analyze the crime data to determine instances of crime occurring between the starting location and the ending location 508 Generate a planned route for the vehicle from the starting location to the ending location based on the analyzed crime data

FIG. 7

SYSTEM AND METHOD FOR VEHICLE ROUTE PLANNING

TECHNICAL FIELD

The field of the disclosure relates to vehicle route planning and, in particular, to a system that generates and modifies a mission route for a vehicle based on crime rate data.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Autonomous vehicles (as well as non-autonomous or semi-autonomous vehicles) that operate with a trailer can transport a variety of cargo. Such vehicles can travel through areas of high crime, particularly theft or damage crime relating to the vehicle and/or the cargo being transported. Therefore, in some instances, the fastest route between a starting location and an ending location for a mission may not be the ideal route if there is a higher likelihood of damage or theft associated with the vehicle or cargo. Such theft or damage to the cargo can have a significant impact on distribution chains and can affect the overall reputation of the transportation company.

Accordingly, there exists a need for a system and a method of vehicle route planning that generates a mission route based on crime rate data, and allows for selection or modification of the generated route based on a risk factor associated with the mission route. These and other needs are met by the exemplary system for vehicle route planning discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an exemplary system for vehicle route planning is provided. The system includes a database configured to electronically store crime data. The system includes a route planning unit configured to generate a route for a vehicle. The system includes a processing device in communication with the database and the route planning unit. The processing device is configured to execute instructions stored in a memory to perform operations that include receiving as input at the route planning unit a starting location for the vehicle and an ending location for the vehicle. The operations include analyzing the crime data to determine instances of crime occurring between the starting location and the ending location. The operations include generating a planned route for the vehicle from the starting location to the ending location based on the analyzed crime data.

The crime data can include historical theft crime data associated with vehicles and/or cargo transported by the vehicles. The system can include one or more sensors associated with the vehicle. In some embodiments, the one or more sensors can include, e.g., cameras, LiDAR, radar, microphones, or the like. In some embodiments, the sensors can include, e.g., video surveillance cameras in combination with AI-powered video analytics to detect movements, unusual behaviors, facial recognition, and/or other patterns that may indicate criminal activity. In some embodiments, the sensors can include, e.g., thermal cameras configured to detect people and/or vehicles in low light and/or at night. In some embodiments, the sensors can include, e.g., motion sensors, such as passive infrared (PIR) sensors that detect movement of warm objects (like humans) and/or IMU sensors that measure unexpected movement. In some embodiments, the sensors can include, e.g., acoustic sensors, such as gunshot detection systems that detect gunshots and determine their origin, audio analysis sensors (including microphones) that detect specific sounds, such as breaking glass or loud yelling, or the like. In some embodiments, the sensors can include, e.g., pressure sensors, such as ground sensors that detect changes in pressure, such as when someone walks over or moves into a restricted area. In some embodiments, the sensors can include, e.g., chemical and/or gas sensors, such as drug and explosive detectors. In some embodiments, the sensors can include, e.g., wireless network and/or cybersecurity sensors, such as intrusion detection systems that monitor and detect suspicious activity or intrusions in computer networks to protect data and systems. The one or more sensors can be configured to detect and capture in real-time crime occurring with the vehicle or a trailer associated with the vehicle.

In some embodiments, the vehicle can be an autonomous or a semi-autonomous vehicle. The operations can include generating a crime rate value for the planned route based on the instances of crime occurring along the planned route. The crime rate value can be a weighted value based on a comparison of the instances of crime occurring along the planned route versus instances of crime occurring along other possible routes from the starting location to the ending location.

In some embodiments, the operations can include receiving as input at a user interface a route risk value. In some embodiments, the user interface can include a sliding scale selection for the route risk value. In some embodiments, the route risk value can be a numerical value between 0 and 10. Generating the planned route can include weighting the crime data along one or more possible routes between the starting location and the ending location. The operations can include assigning a generated route risk value for each of the one or more possible routes. The operations can include narrowing the one or more possible routes based on whether the generated route risk value for the respective one or more possible routes is equal to or greater than the selected route risk value.

In some embodiments, the operations can include receiving as input at a user interface, a time selection for a maximum length of travel from the starting location to the ending location, and generating the planned route based on the time selection. In some embodiments, the operations can include receiving as input at a user interface a fuel consumption selection for an amount of fuel used for travel of the vehicle from the starting location to the ending location, and generating the planned route based on the fuel consumption selection.

In some embodiments, the operations can include receiving as input at a user interface an infrastructure existence selection between the starting location and the ending location, and generating the planned route based on the infrastructure existence selection. In some embodiments, the operations can include receiving as input at a user interface a freight value selection associated with the vehicle, and generating the planned route based on the freight value selection. In some embodiments, the operations can include generating an alert via a user interface regarding an elevated crime instance as the vehicle travels along the planned route.

In another aspect, an exemplary computer-implemented method for vehicle route planning is provided. The method includes electronically storing crime data in a database, and executing instructions stored in a memory with a processing device in communication with the one or more sensors to perform operations for vehicle route planning. The operations include receiving as input at a route planning unit a starting location for the vehicle and an ending location for the vehicle. The operations include analyzing the crime data to determine instances of crime occurring between the starting location and the ending location. The operations include generating a planned route for the vehicle from the starting location to the ending location based on the analyzed crime data.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 7 is a flowchart of a method for vehicle route planning.

Figure 1:
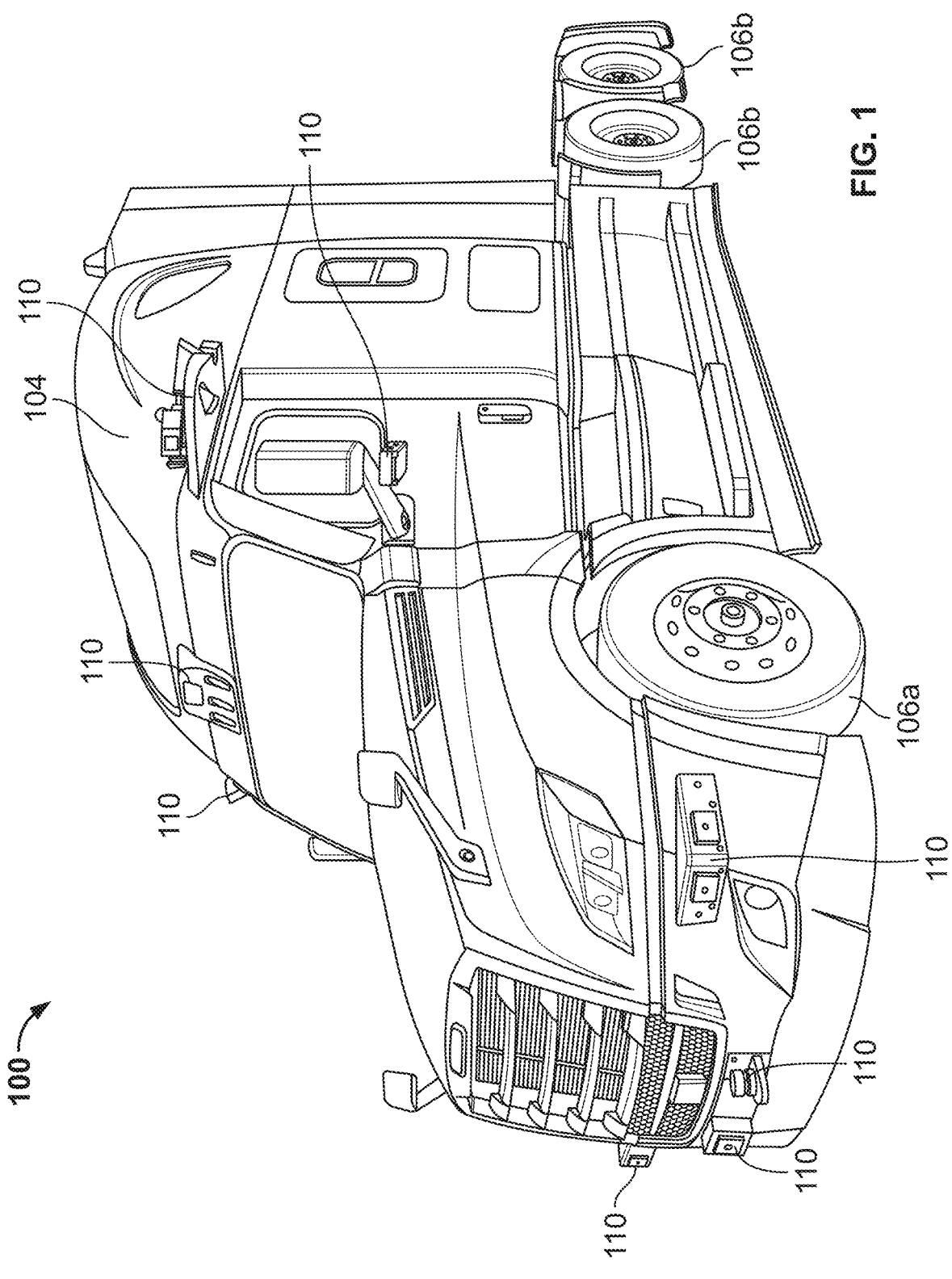
FIG. 1 is a schematic perspective view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

The exemplary system for vehicle route planning can assist with generating a route for vehicles that reduces the risk of theft or damage to the cargo being transported. The system can similarly be used for route planning for other types of vehicles in an attempt to reduce the risk of crime occurrences. With respect to vehicles having trailers that transport cargo, cargo theft or damage can be a significant concern for industries that involve shipping, trucking and logistics, as it poses substantially financial losses and operational challenges. The stolen or damaged cargo can range from consumer products and electronics to pharmaceuticals, food, and high-value merchandise. Some criminals may target specific types of cargo based on their market value or demand. In general, cargo theft is an increasing problem all over the world, causing billions in damage and costs.

The methods employed by cargo thieves can vary widely. Some thieves use sophisticated techniques, such as hacking into tracking systems or impersonating legitimate personnel, while others resort to more traditional methods, such as hijacking trucks or breaking into warehouses. The stolen goods are often quickly moved into the black market, making recovery challenging for law enforcement. The consequences of cargo theft extend beyond financial losses. Businesses may face disruptions in their supply chains, increased insurance premiums, and potential damage to their reputations as a result of cargo theft. To combat cargo theft, companies and law enforcement agencies generally use various strategies, e.g., enhanced security measures, improved tracking technologies, collaboration within the industry to share information about potential threats, or the like. Efforts to address cargo theft often involve a combination of preventative measures, intelligence sharing, and legislative actions, to strengthen penalties for those involved in these criminal activities. As technology continues to advance, the challenge is to stay ahead of evolving tactics employed by cargo thieves and to ensure the security and integrity of global supply chains.

Some preventative techniques that can be used to minimize cargo theft/damage include, e.g., enhanced security measures, choosing secure transport routes, employee training and background checks, supply chain collaboration, data analytics and risk assessment, combinations thereof, or the like. For example, investment in advanced security technologies, such as GPS tracking systems, surveillance cameras, and tamper-evident seals, can provide real-time visibility and deter potential thieves. Conducting a thorough risk assessment of transport routes to identify high-risk areas that are vulnerable to theft can also be helpful. Companies can work with law enforcement where necessary and implement additional security measures, such as armed escorts or convoy systems in high-risk zones. Screening of employees involved in cargo handling for criminal records or suspicious activity may be helpful. Providing comprehensive training on alert recognition, reporting procedures and emergency protocols can improve the overall process of cargo transport. For supply chain collaboration, fostering strong partnerships with industry stakeholders, including ship owners, charterers, logistics providers, retailers, law enforcement and trade associations may be helpful by sharing information on emerging threats to help jointly defend against organized crime networks. Technology platforms can be used to analyze historical data trends to identify patterns related to cargo theft to develop targeted prevention strategies.

The exemplary system discussed herein relies on historical (and, in some instances, real-time) crime data to generate a mission route for a vehicle in an effort to reduce the risk of falling victim to cargo theft/damage. Although discussed herein as intended to avoid cargo theft/damage, it should be understood that the exemplary system can be similarly used to avoid other crimes, e.g., crimes against drivers, or the like.

As technology evolves, vehicles (including autonomous and semi-autonomous vehicles) are generally equipped with an increasing number of sensors which are useful to fulfill the driver (or driverless) assistance functions, or even the full driving task. The sensors allow for a detailed perception of the truck environment. In case of criminal activities within the sensor range or field-of-view, the data collected can include important information for successful conviction of a perpetrator. The collected crime data can also be used as a historical record to determine which areas or routes generally encounter a higher instance of crime associated with the vehicle and/or cargo transported by the vehicle. In some embodiments, in addition to crime data collected by the vehicles, publicly available crime data can also be input into the system to supplement the information relied upon in generating routes for the vehicle.

In particular, the exemplary system can receive as input the crime data and can, e.g., predict a route-dependent crime probability, provide a low-risk route planner, and enables in-vehicle warnings during the trip for crime prevention. For example, the system can be used to generate a route from a starting location to an ending location, and outputs the probability of crime occurring along the route based on the historical crime data, e.g., via risk modeling. As a further example, the system can include a user interface that allows the user to select the "risk appetite" or "risk level" for the route to be generated, and based on crime data, the system generates a mission route that meets the risk level selected by the user. This allows the user to choose the risk level depending on other needs of the user, such as the value of the cargo, fuel consumption, timing requirements, infrastructure requirements, combinations thereof, or the like.

As a further example, based on the historical data, the system can issue warnings to a user interface (and/or a user mobile device) to indicate when high crime areas are being entered by the vehicle. In some embodiments, based on real-time crime data, the system can issue similar warnings to the user when crime is occurring in the vicinity of the vehicle. In some embodiments, based on historical and/or real-time crime data, the system can automatically take action with the vehicle to reduce the risk of crime occurrence, e.g., lock all doors, reduce instances of full stops, or the like. The exemplary system therefore provides features for risk estimation, planning and reduction for vehicles.

In operation, the automated vehicle (using its sensors) observes crime scenes/occurrences and transmits the recorded data to a central database that stores the crime data. The sensors can include, e.g., LiDAR, radar, cameras, microphones, combinations thereof, or the like. The data can include raw and/or fused sensor data, as well as the location, date and time of the crime. The data is processed by the system and can be stored in a standard schema that allows for comparison of crime scenes. The system can identify the type of crime from the data and groups similar crimes together for improved usage by the system in the future when assessing risk probability along routes.

In some embodiments, rule-based and machine learning algorithms can be used to identify crime patterns based on, but not limited to, e.g., similarity between progression of events, number of involved perpetrators, objects and vehicles, location (GPS coordinates, highway, urban, or the like), traffic situations (empty road, low/high traffic, or the like), time and data, duration of events, type of crime, or the like. Based on the identified crimes and analysis, available driving routes can be associated with a risk value, such that a weighted risk value can be assigned to a generated route from a starting location to an ending location. For example, the system can weigh the risk values for each section of a generated route to output a "final" or "total" risk value for the generated route based on the individual route section crime data information.

In some embodiments, the system can offer a low-risk route planner, with the intent to generate a route that offers the least risk available from the route options. In some embodiments, the system can offer a route planner that provides the option to choose the amount of risk the user is willing to take. The system uses the crime data weighted values for each section of roadway (for roadways having crime data available) to generate different routes that as a whole fall within the risk value selected by the user.

For example, the user may wish to transport cargo/freight from point A to point B. The system can select the optimal route by optimizing the crime risk (CR), distance (d), travel time (T), fuel consumption (c), and available infrastructure (I) for on road support (e.g., distance to and density of fuel stations, garages, police stations, or the like), if needed. The system can execute an algorithm based on Equation 1 below, which represents a weighted cost function:

$$\sum (w_1 \cdot CR) + (w_2 \cdot d) + (w_3 \cdot T) + (w_4 \cdot c) + (w_5 \cdot I) \qquad (1)$$

where the weights $w_i$(i=1 . . . 5) are chosen to balance the needs and risk appetite of the user, e.g., depending on freight value. In some embodiments, the user interface can include sliders or similar selectors that allow the user to indicate the settings for generating the route. For example, for risk appetite, fuel consumption and infrastructure, the user can select values between "low" and "high", while for time the user can select values between "fast" and "slow". The route planner provides the best route based on the customer weight selection input into the system.

In some embodiments, the weights w=mu/n can consist of two components, where mu in [0,1] is the impact value, and n is the normalizing factor for the corresponding parameter (CR, d, T, C, I). The value n is chosen such that each parameter is normed in the same way, e.g., between 0 and 1. For example, travel time T can be estimated for the different route candidates and n=$T_{max}$ can equal the longest route in terms of time. This scales T to a maximum value of 1. This can be done for all parameters to ensure comparability. The value mu is then chosen as a value between 0 and 1 according to the user preferences. As another example, if time is not important, but risk should be as low as possible, the system can assign the values for mu as follows: $mu_{risk}$=1 and $mu_{time}$=0.

In some embodiments, the system can provide a crime warning feature for users. Based on the crime data, the system can generate crime risk values for each section of roadway (where crime data is available), as well as crime risk values for cities/locations. With this information, the system can be continuously informed about the current, real-time risk of driving through certain areas. Risk thresholds can be defined ($CR$>$CR_{max}$) to include additional warnings, such as push notification for driver/operator, voice output, acoustic warning, or the like. The same thresholds can be used to trigger specific behaviors of the vehicle, e.g., doors can be automatically locked during driving and parking in areas of high crime rates. A combination of risk and driving velocity allows for less pushy settings such that the trigger is only activated if $CR$>$CR_{max}$ and $v$<$V_{min}$. In particular, the system can rely on both the crime risk value and the velocity of the vehicle to make decisions regarding specific behaviors of the vehicle.

The values for crime risk and velocity can be tunable factors adjustable by user preferences or inputs to the system. For example, if the crime risk is input as a percentage, a value of 50% could make sense, but is determined based on the user's input regarding the risk threshold. As a further example, if the velocity is below a minimum velocity, the specific behaviors can be initiated to reduce the chance of cargo theft. In some embodiments, a predetermined minimum velocity threshold, e.g., 20 mph, or the like, can be used by the system. The minimum velocity threshold can be taken from data analysis, considering the velocity dependent braking distances, the speed of pedestrians, and potentially looking at speed differential/deceleration instead of an absolute value. This consideration can come from the assumption that the vehicle must be stopped before an attack, where higher deceleration could indicate an obstacle which is used to stop the vehicle.

The system offers a variety of advantages for operation of the vehicle. The system can provide more detailed data from crime scenes for investigation and identification of perpetrators, and for appropriate preparation of emergency personnel before arriving at a crime scene. The system offers a reduction of risk for drivers, operators, emergency personnel, and customers, thereby saving lives and money by avoiding or reducing critical situations and loss of goods due to theft. The system offers risk computation for selecting routes that allow for informed business decisions of fleet operators. In some instances, the risk computation can be used to generate new insurance models, e.g., lower/higher fees when staying or passing in safe/unsafe regions.

Various embodiments in the present disclosure are described with reference to FIGS. 1-9 below.

Figure 2:
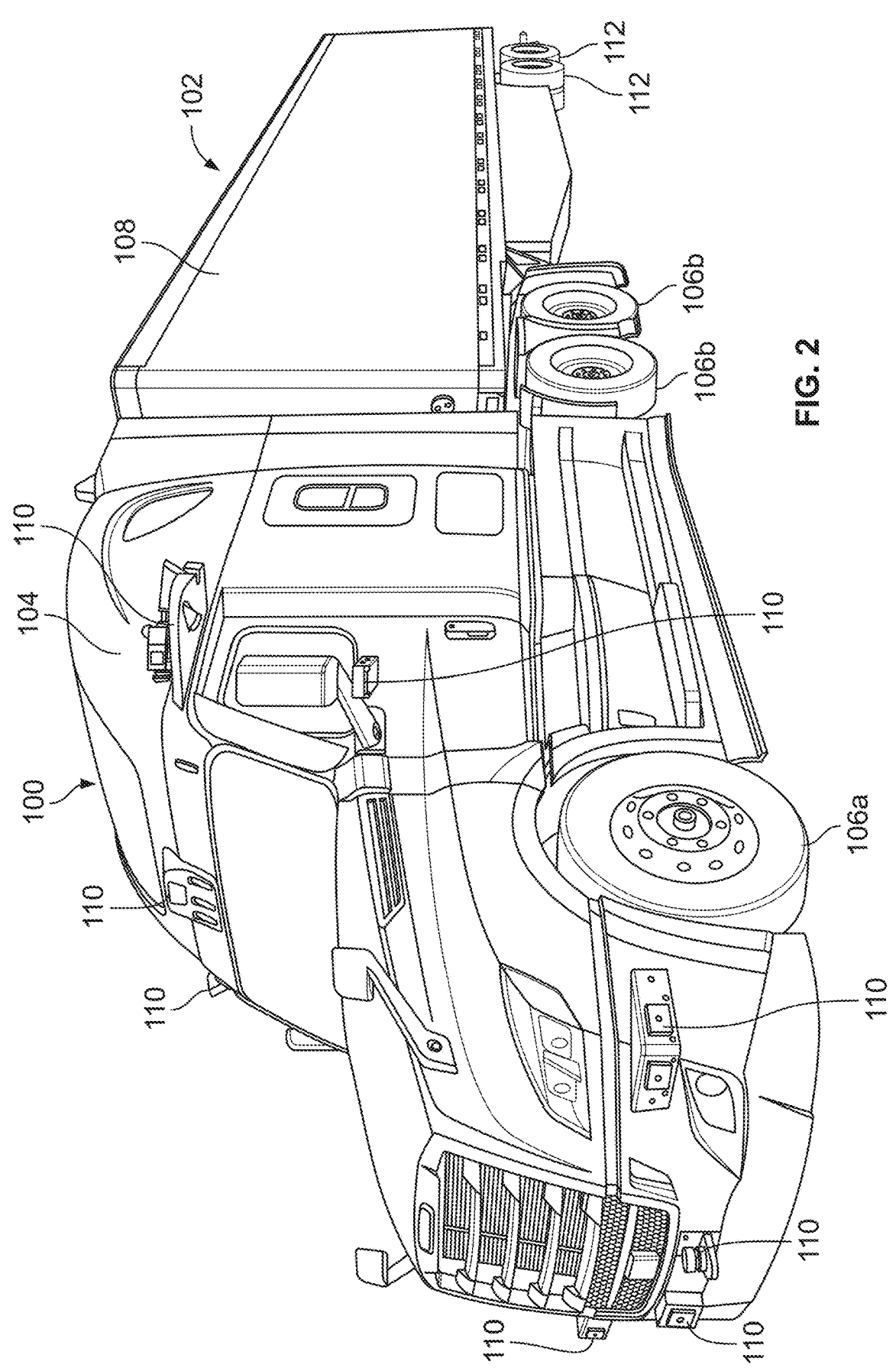
FIG. 2 is a schematic perspective view of an autonomous truck and trailer.
Figure 3:
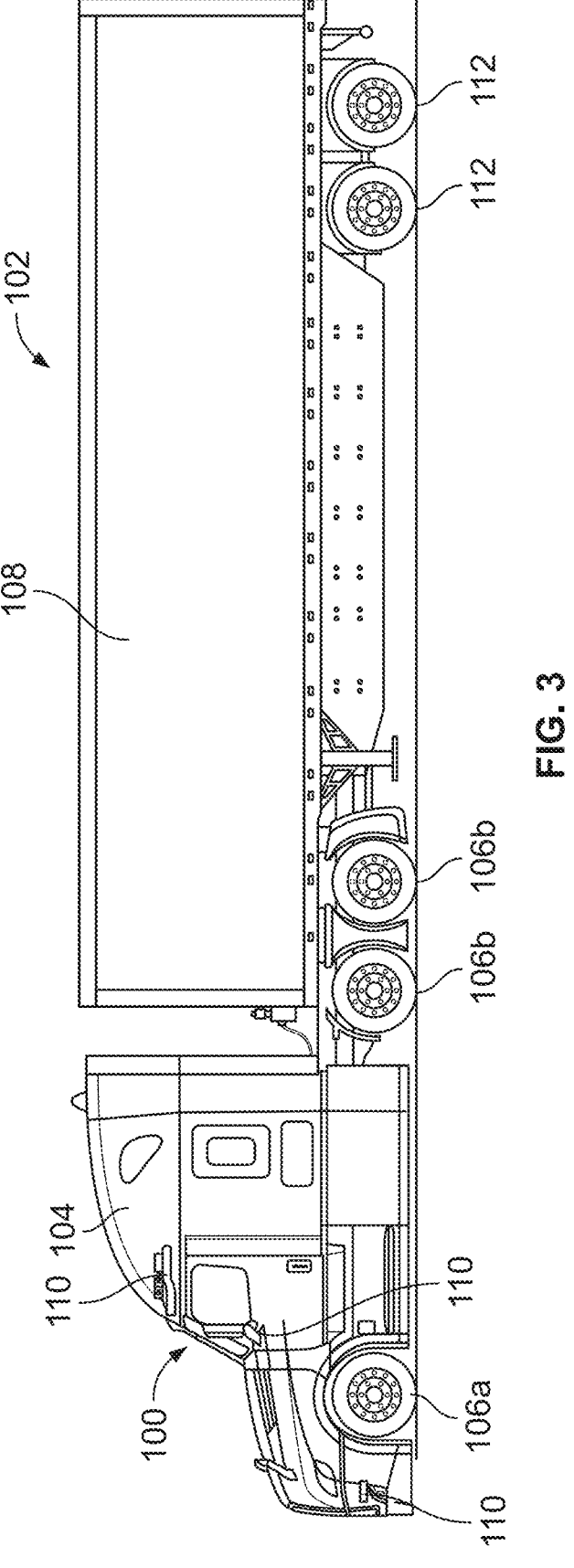
FIG. 3 is a schematic side view of an autonomous truck and trailer.

FIG. 1 is a perspective view of a vehicle 100, such as a truck that may be conventionally connected to a single or tandem trailer 102 to transport the trailer 102 to a desired location, as shown in FIGS. 2 and 3, which are, respectively, perspective and side views of the vehicle 100 of FIG. 1 with the trailer 102 attached thereto. The vehicle 100 includes a cabin 104 that can be supported, and steered in the required direction, by front wheels 106a and rear wheels 106b that are partially shown in FIG. 1. The front wheels 106a are positioned by a steering system that includes a steering wheel and a steering column (not shown). The steering wheel and the steering column may be located in the interior of cabin 104.

The vehicle 100 may be an autonomous vehicle, in which case the vehicle 100 may omit the steering wheel and the steering column to steer the vehicle 100. Rather, the vehicle 100 may be operated by an autonomy computing system of the vehicle 100 based on data collected by a sensor network including one or more sensors, e.g., sensors 110 shown in FIGS. 1-3. The vehicle 100 may additionally include a fifth-wheel coupling (not shown) to which the trailer 102 can be releasably attached. The trailer 102 can include a storage container 108 and a plurality of rear wheels 112 that support the storage container 108. It should be understood that in some embodiments the vehicle 100 and the trailer 102 can be a permanently attached as a single unit.

The sensors 110 have a field-of-view at the front, sides and/or rear of the vehicle 100. Similar sensors 110 can be used around the perimeter of the vehicle 100 to ensure full environmental coverage around the vehicle 100 is provided by the sensors 110. In some embodiments, the vehicle 100 can include, e.g., 5-6 LIDAR sensors, 8-10 cameras, combinations thereof, or the like. In some embodiments, the vehicle 100 can tow a trailer 102 and the trailer 102 can similarly include LIDAR sensors and/or cameras to provide field-of-view coverage around the perimeter of the vehicle 100 and the trailer 102. The environmental coverage by the sensors and/or cameras therefore provides data corresponding with the front, rear, sides and corners of the vehicle 100 and the trailer 102 hauled by the vehicle 100.

Figure 4:
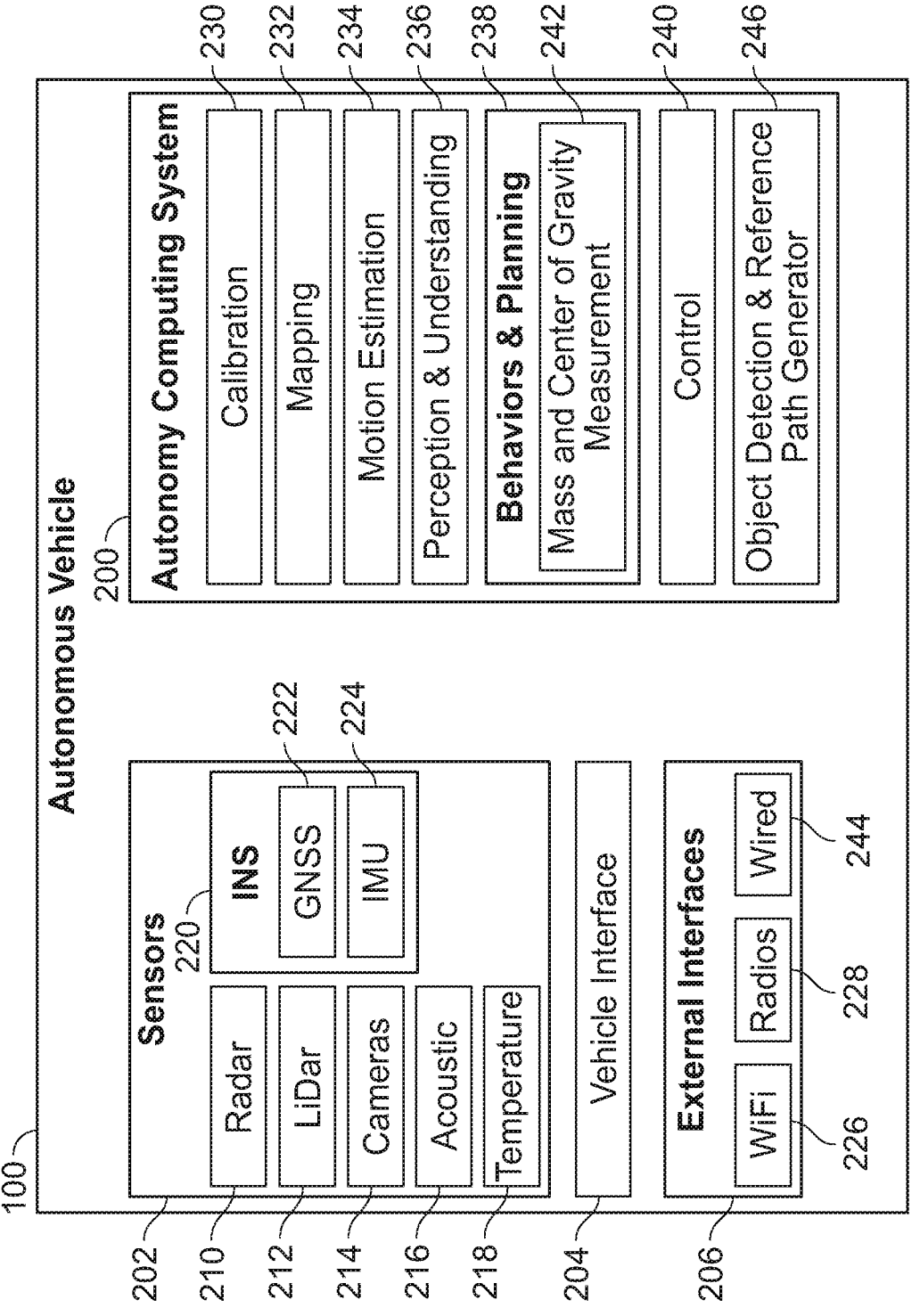
FIG. 4 is a block diagram of the autonomous truck shown in FIGS. 1-3.

FIG. 4 is a block diagram representing autonomous vehicle 100 shown in FIGS. 1-3. In the example embodiment, autonomous vehicle 100 generally includes autonomy computing system 200, sensors 202, a vehicle interface 204, and external interfaces 206. It should be understood that the sensors 110 on the vehicle 100 in FIGS. 1-3 and described herein correspond to the sensors identified as 202 in FIG. 4. The sensors 110 may specifically comprise any of the sensors 210-220 shown in FIG. 4 and described herein.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying objects around the vehicle 100, updating a reference path based on the detected objects, and controlling operation of the vehicle 100 to guide the vehicle 100 along its route.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, BLUETOOTH®, etc.).

In some embodiments, external interfaces 206 may be configured to communicate with an external network via a wired connection 226, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a mass and center of gravity measurement module 242, a control module or controller 240, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 246 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 5:
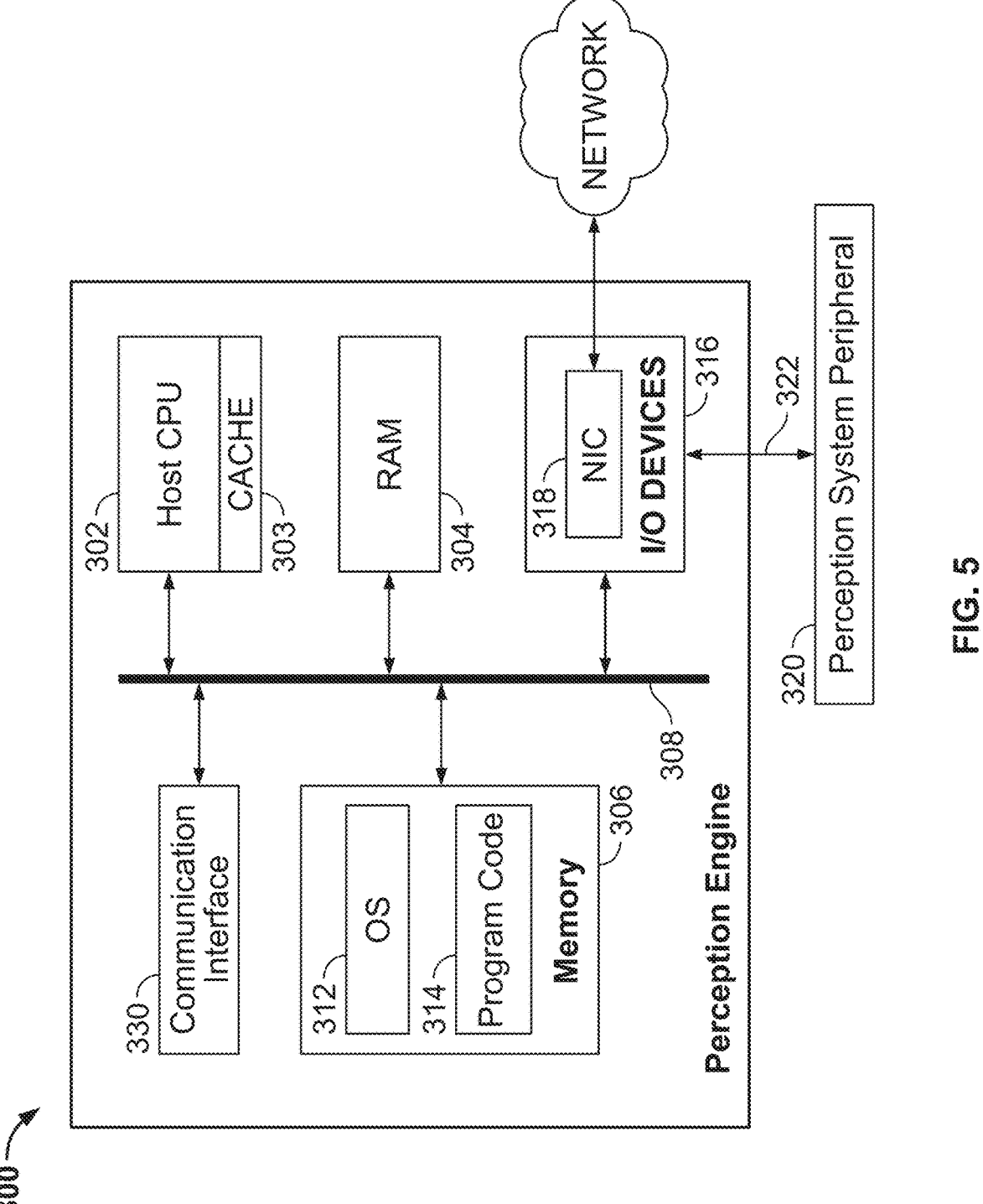
FIG. 5 is a block diagram of an example computing system.

FIG. 5 is a block diagram of an example computing system 300, such as the autonomy computing system 200 shown in FIG. 4, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 4. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface 330 such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 6:
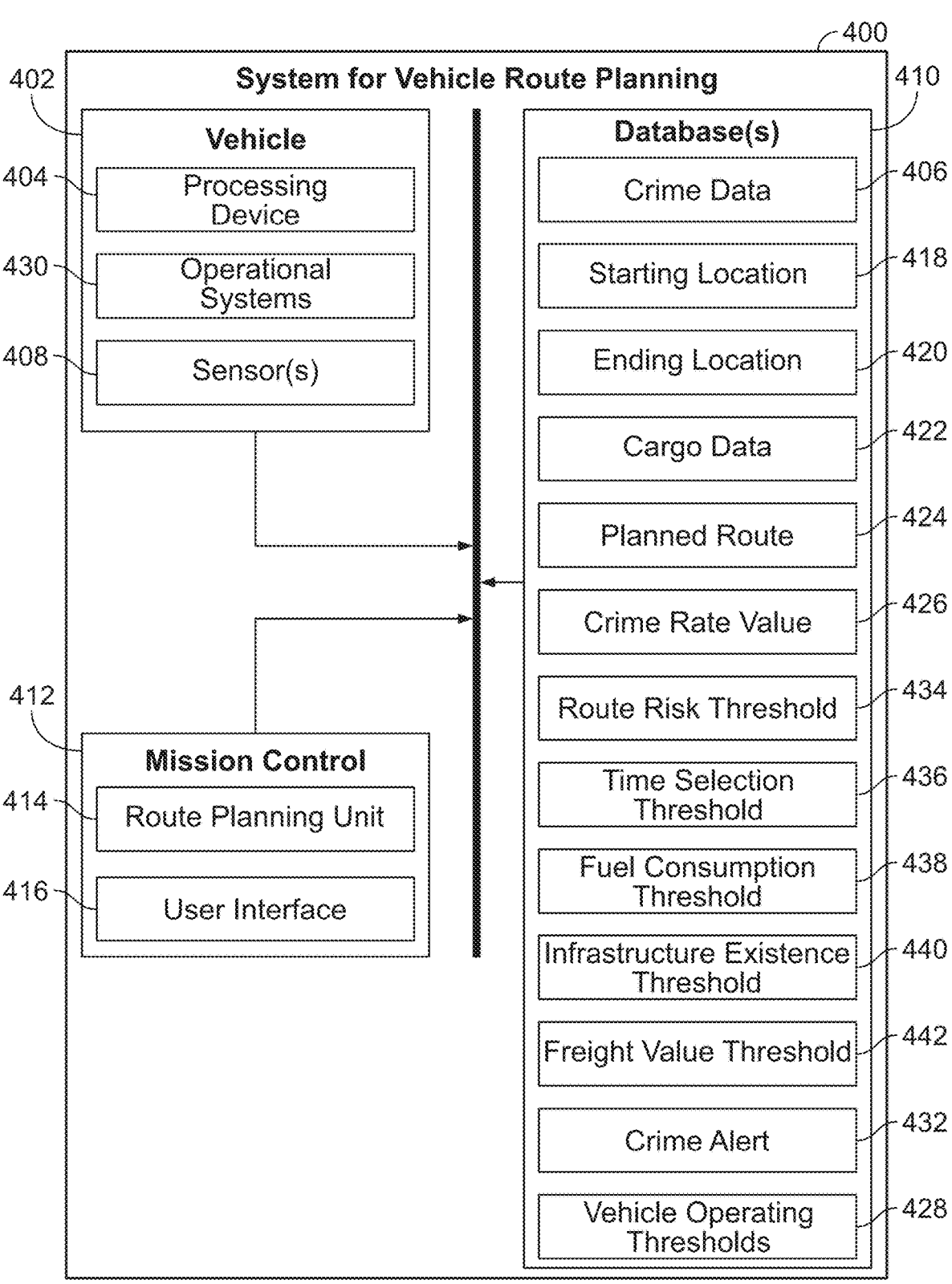
FIG. 6 is a block diagram of an exemplary system for vehicle route planning.

FIG. 6 is a block diagram of an exemplary system 400 for vehicle route planning. The system 400 generally includes one or more vehicles 402 (e.g., autonomous vehicle 100, semi-autonomous vehicle, non-autonomous vehicle, or the like). Each vehicle 402 includes a processing device 404 (e.g., computing system 200, computing system 300, or the like) configured to receive and process data relating to crime data 406 for generating a route for the vehicle 402. In some embodiments, at least some of the data received by the processing device 404 can be data from one or more sensors 408 (e.g., sensors 202). For example, the sensors 408 can detect occurrences of criminal activity either associated with the vehicle 402 as it travels along routes, and/or criminal activity associated with other vehicles or individuals in the vicinity of the vehicle 402 as it travels along routes. The crime data 406 can include visual images, audio and/or video of the crime, as well as metadata associated with the crime, e.g., location, time, date, or the like.

In some embodiments, the crime data 406 detected by the sensors 408 can primarily focus on crimes involving theft and/or damage to the vehicle 402, a trailer associated with the vehicle 402, and/or cargo being transported by the vehicle 402. In some embodiments, the crime data 406 can include any type of crime. Non-limiting examples of crime data 406 can include data relevant to, e.g., damage, theft, blockages which cause delays and increase costs for the operator, crime where the vehicle is not the victim, or the like. The risk of cargo theft may be higher in an area where many burglaries are happening or have happened (based on data analysis). Observing crime outside of the vehicle 402 can trigger a message transmission to the driver, operator or mission control regarding the occurring crime. In some embodiments, the warning/alert transmission can be made to, e.g., local authorities.

The processing device 404 can analyze and categorize the crime data 406 using, e.g., machine learning or artificial intelligence, to compartmentalize the crimes documented by the system 400. In some embodiments, the crime data 406 can include publicly accessible and available data regarding crimes that have previously occurred. The crime data 406 therefore includes historical data regarding crimes that may be of interest to the system 400. As discussed herein, the crime data 406 can be used to estimate the risk probability for crime along route(s) generated for the vehicle 402, allowing the user to determine if low or high risk areas should be traveled through for delivery of cargo. The crime data 406 can also be used to issue alerts to the user and/or automatically actuate certain behaviors for the vehicle 402 when entering high crime areas. In some embodiments, the sensors 408 can detect crime occurring in real-time, and adjust behavior parameters associated with vehicle 402 and/or issue alerts to the user accordingly.

The vehicle 402 can include one or more databases 410 (e.g., memory 306) configured to receive and electronically store data. In some embodiments, the database 410 can be stored externally from the vehicle 402 and the vehicle 402 can be in communication with the external database 410 for receiving and/or transmitting data associated with the system 400. The database 414 can electronically store the crime data 406, and any other data collected by the sensors 408. The vehicle 402 and the database 410 can be in communication with mission control 412 for operation of the system 400. Mission control 412 can include a route planning unit 414 and a user interface 416, e.g., a graphical user interface. In some embodiments, the user interface 416 can be at one or both of the vehicle 402 and mission control 412.

The system 400 can receive as input at the user interface 416 the starting location 418 and the ending location 420 (e.g., the final or intermediate location) for the vehicle 402. In some embodiments, the system can receive as input at the user interface 416 cargo data 422, such as the type of cargo, the size of the cargo, the value of the cargo, or the like. The input data, including the crime data 406, is used by the route planning unit 414 to generate one or more planned routes 424 for the vehicle 402 to travel from the staring location 418 to the ending location 420. In particular, the system 400 takes into account the crime data 406 along different route options from the staring location 418 to the ending location 420 and determines the crime rate value 426 assigned to the planned routes 424. The crime rate value 426 can be a numerical value between, e.g., 0 or 1 and 100, inclusive, and can be a weighted value based on crime rate values 426 for individual sections of roadway and/or towns/cities along the route 424.

For example, the unit 414 can weigh the crime data 406 along individual sections of roadways and generates an overall crime rate value 426 for the planned routes 424 based on a weighing of the crime data 406. As a further example, if instances of crime are low in a specific section of roadways, the crime rate value 426 can be lower for such areas. In contrast, if instances of crime are high in a specific section of roadways, the crime rate value 426 can be higher for such areas and affects the total crime rate value 426 for the route. In some embodiments, the system 400 can output and recommend the planned route 424 with the lowest crime rate value 426. In some embodiments, the system 400 can output the different planned routes 424 available (if more than one route available) with the crime rate value 426 associated with each route 424 at the user interface 416, and the user can select which route 424 to take.

In some embodiments, the total risk can be defined as the expected value of a risk function R(x), as shown by Equation 2:

$$\text{Total Risk} = \mathbb{E}[R(x)] = \int_{-\infty}^{\infty} R(x) \cdot f(x) dx \qquad (2)$$

where x is a random variable (e.g., damage amount, losses, or the like), f(x) is the PDF of x (describing the probability density), R(x) is a risk function that represents the damage or loss associated with a specific x. The crime risk can be estimated based on historical data for each road segment x. The ideal segment size can be a tunable or user selected value/parameter, and can depend on the data availability. In some embodiments, the segment size can be about, e.g., 10 mile segments, or the like. The estimation model can either use statistical analysis directly or can be based on a trained ML model which estimates crime risk and confidence of the estimate based on the mentioned input factors. The overall crime risk is the expected value of a risk function R(x).

The crime rate value 426 for the selected planned route 424, and the crime data 406 associated with the individual sections of the route 424, can be used to automatically adjust the operating parameters or thresholds 428 of the vehicle 402 as it travels along the selected route 424. For example, the vehicle operating thresholds 428 can include automatically locking doors of the vehicle 402 when the vehicle 402 is passing through areas of high crime rates. As a further example, the vehicle operating thresholds 428 can include maintaining movement of the vehicle 402 as long as possible (e.g., by slowing down when approaching red lights in an attempt to maintain movement until the light turns green) when passing through areas of high crime rates to reduce instances of potential crime occurrence. In some embodiments, if the sensors 408 detect crime occurring in real-time as the vehicle 402 travels along the route 424, the operating thresholds 428 can be initiated. In some embodiments, if the sensors 408 detect crime occurring in real-time as the vehicle 402 travels along the route 424, the system 400 can, e.g., increase the desired minimum speed limit of the planner, keep larger distances for more flexibility of reactions and avoidance, increase the target speed limit (up to the legal speed limit) to ensure quick passing of risky areas or occurrences, request remote assistance support to use "human eyes" to monitor the drive conditions/situation, or the like. These operating thresholds 428 can be transmitted to one or more operational systems 430 (e.g., autonomy computing system 200) of the vehicle 402 to regulate operation of the vehicle 402 along the route 424.

In some embodiments, if the vehicle 402 is traveling through an area having high crime rates and/or if crime is detected in real-time by the sensors 408, a crime alert 432 can be issued via the user interface 416. In some embodiments, the crime alert 432 can be output at the user interface 416 of the vehicle 402, the user interface 416 of mission control, and/or a user interface associated with a mobile device of the user traveling in the vehicle 402.

In some embodiments, the decision to issue the crime alert 432 and/or to control the operating thresholds 428 can be made by the system 400 based on the current operating status of the vehicle 402. For example, if the vehicle 402 is traveling at a low speed (e.g., less than 15 mph), there may be a higher chance of crime occurring with the vehicle 402 and the crime alert 432 and/or operating threshold 428 regulation can be performed. In contrast, if the vehicle 402 is traveling at a higher speed (e.g., 15 mph or more), the crime alert 432 and/or operating threshold 428 regulation can be avoided and can be considered unnecessary. In some embodiments, the system 400 can consider various factors before sending the crime alert 432 and/or regulating the operating threshold 428, e.g., whether the vehicle 402 is slowing down or has a high deceleration rate (as compared to a baseline normal operation value), whether the vehicle 402 is speeding up or has a high acceleration rate (as compared to a baseline normal operation value), whether the vehicle 402 is far from the posted speed limit, if there is a deviation from the expected speed of the vehicle 402 based on the route planned and/or traffic patterns, if there is any deviation from expected performance of the vehicle 402, combinations thereof or the like. In some embodiments, comfort breaking for the vehicle 402 can be between about 1-2 m/s$^2$ inclusive, and normal breaking can be between about 2-4 m/s$^2$ inclusive. Everything above 6 m/s$^2$ can be considered high breaking. With this in mind, the system 400 can rely on a value of about 4 m/s$^2$ to indicate unexpected deceleration. General values can be used in manual driving mode, while values can be derived from the internal planner states of an autonomous vehicle.

In some embodiments, the user interface 416 can allow the user to input various parameters for consideration by the route planning unit 414, thereby offering a customization tool that is usable to generate a planned route 424 that coincides with interests of the user. For example, the user interface 416 can include the input of the starting location 418, the ending location 420, and (optionally) cargo data 422. The user interface 416 can further include inputs for, e.g., a route risk threshold 434, a time selection threshold 436, a fuel consumption threshold 438, an infrastructure existence threshold 440, and a freight value threshold 442. In some embodiments, these inputs can be in the form of a sliding scale or slider (see, e.g., FIG. 8). For example, the slider can allow for selection between 0 or 1 and 10, inclusive, with 0 or 1 indicating a lowest value and 10 indicating a highest value for the parameter.

The route risk threshold 434 can allow the user to decide whether the level of risk for the route (e.g., the crime rate value) based on crime data 406. For example, if the user is interested in quickly transporting the cargo without worrying about how risky the route may be, the user can select a high route risk threshold 434. In contrast, if the cargo is valuable and time is not of the essence, a low route risk threshold 434 can be selected to reduce the chance of crime occurring along the route. The time selection threshold 436 allows the user to decide how quickly the cargo transport should take place between the string location 418 and the ending location 420. The fuel consumption threshold 438 allows the user to decide how much fuel the vehicle 402 can use along the route. The infrastructure existence threshold 440 allows the user to decide how many supporting features are available along the route, e.g., gas stations, repair shops, police departments, or the like. The freight value threshold 442 allows the user to decide the value of the freight/cargo being transported.

Based on the user selections, the system 400 generates a planned route 424 and can output the crime rate value 426 for consideration by the user. The output can also include details regarding time, fuel consumption, infrastructure existence, and freight value. Based on the output information, the user can adjust the positions of the input information for the thresholds 434, 436, 438, 440, 442 and the route planning unit 414 can update in real-time the planned route 424 and the associated information. The system 400 can thereby offer a customized route planning tool that allows the user to consider crime data 406 along the route, providing an informed decision making mechanism for transporting cargo with the vehicle 402 to reduce instances of crime and optimizing route planning.

FIG. 7 is a flowchart of a method of vehicle route planning by the exemplary system 400 discussed herein. At 500, crime data can be electronically stored in a database. At 502, a processing device can execute instructions stored in a memory to perform operations for vehicle route planning. At 504, the operations can include receiving as input at the route planning unit a starting location for the vehicle and an ending location for the vehicle. At 506, the operations can include analyzing the crime data to determine instances of crime occurring between the starting location and the ending location. At 508, the operations can include generating a planned route for the vehicle from the starting location to the ending location based on the analyzed crime data.

Figure 8:
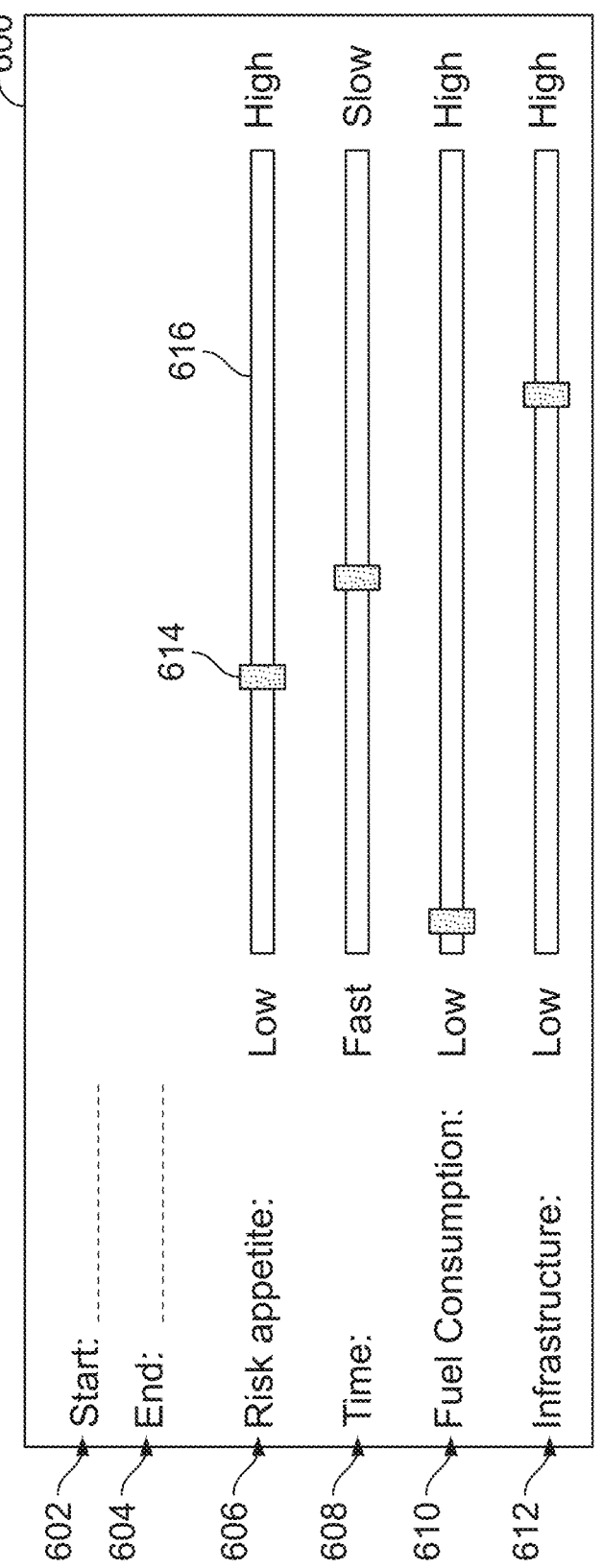
FIG. 8 is a diagrammatic view of a user interface for vehicle route planning.

FIG. 8 is a diagrammatic view of a user interface 600 (e.g., user interface 416) for customized route planning for a vehicle. As discussed herein, the user interface 600 can receive various inputs from the user, e.g., the starting location 602, the ending location 604, the risk value or appetite 606, the time threshold 608, the fuel consumption 610, the infrastructure threshold 612, or the like. The user interface 600 can also include a similar input for the cargo value threshold. At least some of the inputs can include a sliding scale interface, e.g., a slider 614 movable along a scale 616, to allow the user the option of selecting the desired threshold for certain values. Based on this input, the system can generate one or more planned routes that meet the criteria of the user.

Figure 9:
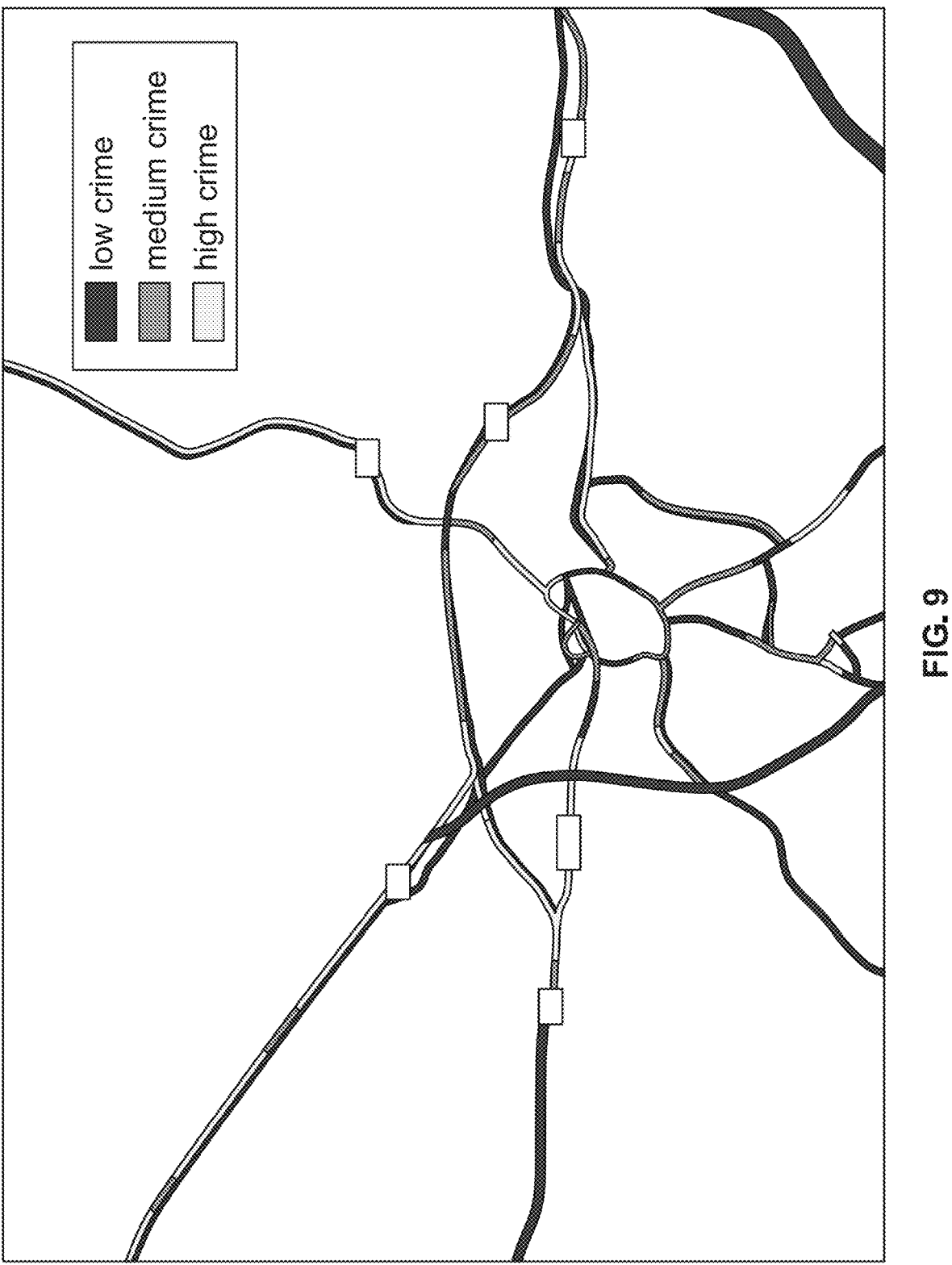
FIG. 9 is a diagrammatic view of a route map including crime rate data.

FIG. 9 is a diagrammatic view of a route map including crime data usable by the exemplary system. In some embodiments, the route map can be output via the user interface 416, or can be used internally by the system. Based on the collected crime data, each or most sections of the roadways can include a designation of whether the crime rate is high, medium, or low (although more detailed designations are also possible). In some embodiments, the route map can be output to the user via the user interface to visualize when the vehicle 402 is entering into high crime areas. In some embodiments, the route map can be used by the system to determine when the vehicle 402 is entering into high crime areas to issue alerts to the user and/or to regulate vehicle operating behavior in the high crime areas to reduce the risk of crime occurring. The system therefore offers an optimized tool for route planning to ensure safe passage of the vehicle and its associated cargo.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for vehicle route planning, comprising:
a database configured to electronically store crime data;
a route planning unit configured to generate a route for a vehicle; and
a processing device in communication with the database and the route planning unit, wherein the processing device is configured to execute instructions stored in a memory to perform operations comprising:
receiving as input at the route planning unit a starting location for the vehicle and an ending location for the vehicle;
analyzing the crime data to determine instances of crime occurring between the starting location and the ending location;
generating a planned route for the vehicle from the starting location to the ending location based on the analyzed crime data;
identifying, along the planned route, one or more sections having a crime rate value above a predetermined threshold value; and automatically controlling one or more vehicle operations during travel of the vehicle through the one or more identified sections based on the one or more sections having the crime rate value above the predetermined threshold value.

2. The system of claim 1, wherein the crime data includes historical theft crime data associated with vehicles and/or cargo transported by the vehicles.

3. The system of claim 1, wherein the operations comprise generating a crime rate value for the planned route based on the instances of crime occurring along the planned route.

4. The system of claim 3, wherein the crime rate value is a weighted value based on a comparison of the instances of crime occurring along the planned route versus instances of crime occurring along other possible routes from the starting location to the ending location.

5. The system of claim 1, wherein the operations comprise receiving as input at a user interface a route risk value.

6. The system of claim 5, wherein the user interface includes a sliding scale selection for the route risk value, and wherein sliding of the sliding scale selection of the user interface to change the route risk value generates in real-time a new planned route relative to the planned route.

7. The system of claim 5, wherein the route risk value is a numerical value between 0 and 10.

8. The system of claim 5, wherein generating the planned route comprises weighing the crime data along one or more possible routes between the starting location and the ending location.

9. The system of claim 8, wherein the operations comprise assigning a generated route risk value for each of the one or more possible routes.

10. The system of claim 9, wherein the operations comprise narrowing the one or more possible routes based on whether the generated route risk value for the respective one or more possible routes is equal to or greater than the selected route risk value.

11. The system of claim 1, wherein the operations comprise receiving as input at a user interface a time selection for a maximum length of travel from the starting location to the ending location, and generating the planned route based on the time selection.

12. The system of claim 1, wherein the operations comprise receiving as input at a user interface a fuel consumption selection for an amount of fuel used for travel of the vehicle from the starting location to the ending location, and generating the planned route based on the fuel consumption selection.

13. The system of claim 1, wherein the operations comprise receiving as input at a user interface an infrastructure existence selection between the starting location and the ending location, and generating the planned route based on the infrastructure existence selection.

14. The system of claim 1, wherein the operations comprise receiving as input at a user interface a freight value selection associated with the vehicle, and generating the planned route based on the freight value selection.

15. The system of claim 1, wherein the operations comprise generating an alert via a user interface regarding an elevated crime instance as the vehicle travels along the planned route.

16. A computer-implemented method for vehicle route planning, comprising:
electronically storing crime data in a database; and
executing instructions stored in a memory with a processing device in communication with the one or more sensors to perform operations comprising:

receiving as input at a route planning unit a starting location for the vehicle and an ending location for the vehicle;

analyzing the crime data to determine instances of crime occurring between the starting location and the ending location;

generating a planned route for the vehicle from the starting location to the ending location based on the analyzed crime data;

identifying, along the planned route, one or more sections having a crime rate value above a predetermined threshold value; and automatically controlling one or more vehicle operations during travel of the vehicle through the one or more identified sections based on the one or more sections having the crime rate value above the predetermined threshold value.

17. The system of claim 1, wherein automatically controlling one or more vehicle operations of the vehicle during travel of the vehicle through the one or more identified sections includes automatically locking doors of the vehicle.

18. The system of claim 1, wherein automatically controlling one or more vehicle operations of the vehicle during travel of the vehicle through the one or more identified sections includes automatically adjusting a speed of the vehicle to avoid instances of a full stop.

19. The system of claim 1, wherein automatically controlling one or more vehicle operations of the vehicle during travel of the vehicle through the one or more identified sections includes automatically maintaining a greater distance from surrounding vehicles for flexibility in reaction timing and avoidance.

20. The system of claim 1, wherein automatically controlling one or more vehicle operations of the vehicle during travel of the vehicle through the one or more identified sections includes automatically increasing a speed of the vehicle for quicker passage of the vehicle through the one or more identified sections.

* * * * *